Jan. 3, 1961 J. A. ROBERTSON 2,967,091
CARBON COATING OF PHOSPHATE NODULES
Filed July 18, 1957

J. A. Robertson
INVENTOR.

BY Glenn W. Parsons
ATTORNEY

United States Patent Office 2,967,091
Patented Jan. 3, 1961

2,967,091

CARBON COATING OF PHOSPHATE NODULES

James Allen Robertson, Levittown, Pa., assignor to Food Machinery and Chemical Corporation, New York, N.Y., a corporation of Delaware Filed July 18, 1957, Ser. No. 672,803

5 Claims. (Cl. 23—223)

This invention relates to a process for attaining smoother operation of an electric furnace than heretofore has been possible. This invention is particularly concerned with the improvement of the production of elemental phosphorus and the smoother working of an electric furnace for the production thereof.

The invention will hereinafter be described with reference to the production of elemental phosphorus in an electric phosphorus furnace but it is not intended that it should be limited thereto. The invention is applicable to any electric furnace in which it is necessary that a charge be introduced into the furnace above the melting zone thereof, said charge being susceptible to forming a bridge between the electrodes and furnace walls or between two electrodes.

Bridging is a problem which has confronted the industries utilizing electric furnaces for many years, particularly the phosphorus industry. The causes of bridging may vary from operation to operation but the effect of bridging is the formation of a relatively non-porous incrustation across an area overlying the active zone of an electric furnace.

In the production of phosphorus, the burden is fed to the furnace through chutes in the top of the furnace as will be described in greater detail hereinafter. The burden normally consists of coke, silica and calcined shale (phosphate lumps). The calcined shale has the lowest melting point and hence as the burden flows into the furnace the shale becomes partially molten and forms a bridge in the furnace thereby preventing the free flow of the other components of the burden into the furnace. In addition the bridge causes erratic operation of the furnace since it causes a change in the electrical characteristics of the furnace.

Accordingly it is an object of this invention to improve the operation of electric furnaces, particularly those used in the production of phosphorus.

It is another object of this invention to eliminate bridging in the premelt regions of the furnace.

It is another object of this invention to produce a free flowing non-sintering burden for introduction into an electric furnace.

These and other objects will become more apparent from the following description and claims.

Figure 1:
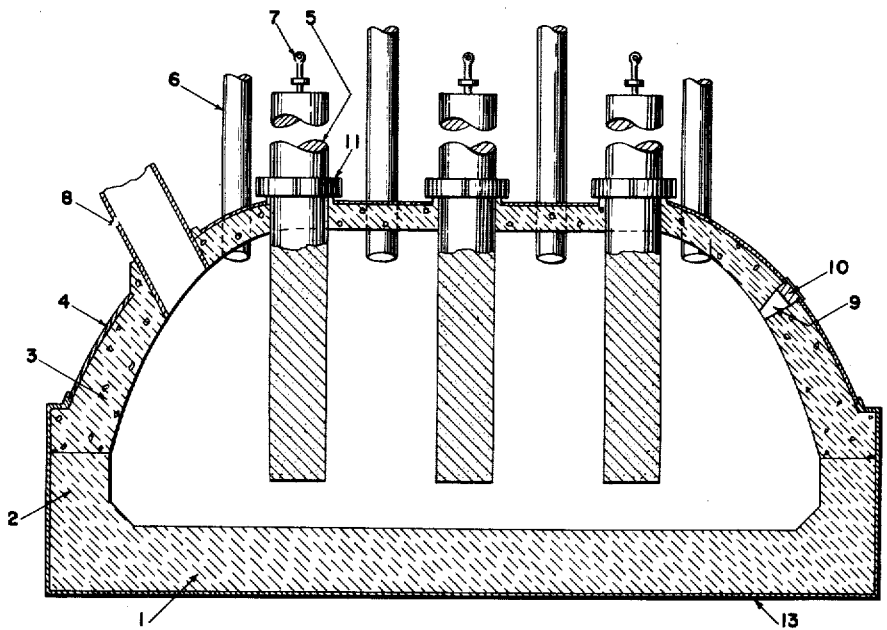
Figure 2:
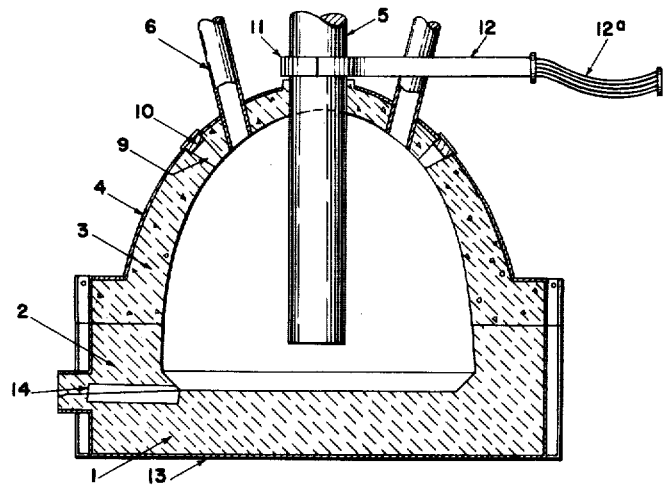

At the present time, elemental phosphorus is produced in a furnace such as that shown in Figures 1 and 2 of the accompanying drawings, and reference should be had thereto in connection with the following description.

A typical electric furnace comprises a hearth section 1 composed of carbon blocks. Walls 2 composed of carbon extend upward from the hearth section to a height above the level where the slag and other molten materials will be when the furnace is in operation. A roof 3 generally composed of a refractory material such as Lumnite cement or firebrick rests upon the carbon walls. The roof is usually cast in place with provision for entrance of electrodes, feed chutes, poke holes and product off-take conduits. If desired, a sealing coat 4 usually made of a fireproof material such as asphaltic asbestos, may be applied to the exterior of the roof 4. It is also desirable in many instances to provide the hearth section 1 with a steel shell 13.

A suitable number of carbon electrodes 5 are inserted into the furnace through the holes provided for them in the roof. Each electrode is equipped with a suitable attachment 7 for raising or lowering the electrode. Each electrode is held by an electrode holder 11 and is in electrical conductance relationship with holder 11 and bus bar 12 shown in Figure 2 only. Suitable conductors 12a, shown in Figure 2 only, connect each electrode with a source of electric current. Another source of electric current (not shown) consists of a generator supplying current to a direct current motor which raises or lowers the electrode. The electrodes are in constant vertical motion to allow for furnace operating conditions. If desired a seal (not shown) may be secured to the furnace at the opening in the furnace where the insertion of the electrode takes place, said seal being adapted to be in contact with the electrode so as to prevent escape of product gases.

A plurality of feed chutes 6 are disposed in pairs on opposite sides of each electrode. The feed chutes penetrate the roof through suitable openings and end flush against the inner surface of the roof. A product off-take conduit 8 is disposed in the upper part of the roof section and is adapted to remove the products of the furnace operation. The products, after removal, are put through a number of steps to remove impurities and to obtain the desired end product.

A number of access holes 9 commonly called "poke" holes, are formed in the roof of the furnace when the roof is cast. The poke holes are adapted to be closed by the insertion of plugs 10. Molten slag and other materials are removed from tape hole 14 in the hearth section at periodic intervals.

The burden as hereinbefore indicated normally consists of a coarse mixture of lumps of coke, calcined shale (phosphate lumps), and silica, and is fed into the electric furnace from the chutes in the top of the furnace. As the burden progresses downwardly into the furnace towards the melting zone, which in the production of phosphorus is at about 1450° C., offcoming gases heat the burden and at some stage the phosphate lumps in the burden reach their sintering range (approximately 1000° C.).

When the downflowing burden reaches the sintering temperature of the phosphate lumps, the lumps become sufficiently molten so that they adhere to each other and affect a resistance to the easy flow of the off gases, thus necessitating a rerouting of the off-gases.

Rerouting of the off-coming gases, allows the bridge to cool before complete melting of the phosphate lumps is attained so that the bridge freezes as a solid mass. This adherence of the phosphate lumps to one another is what is commonly known as bridging. Meanwhile, the other material falls into the melting zone leaving a cavity between the bridge and the melting zone. Mechanical forces, such as the movement of the electrodes or the unsupported weight of the burden causes the bridge to collapse. The cool burden falls into the melting zone and immediately large volumes of gas are evolved which raise the pressure within the furnace causing excessive dust expulsion from the furnace. Moreover, the cold charge cools the furnace and changes its electrical characteristics which, in turn, cause further electrode movement. This erratic furnace operation is characteristic of most electric furnaces in which a burden is fed into the furnace from a chute overhead, and in particular phosphorus furnaces, and appears to be directly related to the extent that bridging occurs within the furnace.

Applicant's invention provides a means for overcoming this bridging and thereby obtaining smoother operation of the furnace. Surprisingly enough, applicant has found that this bridging is prevented by applying a coating of fine carbon to the phosphate lumps in the burden so that the lumps will not adhere to each other at the sintering stage and will instead flow uniformly into the furnace.

Applicant has found surprisingly enough in spite of what would ordinarily be expected that the adhesion is prevented if a specific percentage by weight of carbon is applied to the burden.

The carbon coating of this invention is a very fine, tightly cohering, low conductivity carbon, such as lamp black or carbon black. It is essential that the carbon be of an extremely fine particle size. The carbon should be essentially 100% −325 mesh and preferably of a submicron size.

It has been found that when the phosphate lump has been located with a carbon coating in the range of 0.1–2.0% carbon based on the phosphate lump weight, the above-mentioned bridging does not occur when the burden is fed into the furnace. The best results are obtained when the carbon coating is about 1.0% based on the phosphate lump weight.

Prior to this invention, carbon was merely mixed with silica and calcined shale in a suitable proportion by any suitable means and conveyed to the feed chutes of the furnace by means such as a conveyor system. Actually, the only caution that had to be exercised in the mixing was to see that the particles comprising the burden were of a coarse nature, for example, all particles had to be of a size greater than +6 mesh size with an average mean screen size of 0.6 in.

In the present invention, the carbon coating may be applied in any of several ways. A bituminous material may be spread over the phosphate lump and the coke is developed in situ during progress of the charge through the furnace. The silica would be added to the burden after the phosphate particles had been coated with the carbon. The burden is brought to the furnace by any convenient means such as a conveyor system. This procedure is not completely desirable because of the excessive volatile components which distill off during the coking.

The preferred method because of its simplicity and applicability to the present process consists of tumbling the phosphate lumps in a bed of fine carbon until the desired amount of carbon is retained on the lumps. The quantity of carbon required to provide an adequate coating is somewhat dependent upon the tumbling time. The tumbling time would be governed by the production rate and the tumbling equipment dimensions. If carbon black is used, the carbon adheres to the phosphate lumps with moderate tumbling. For example, using regular furnace-feed nodules, carbon black coatings were applied by tumbling at 0.5, 1.0 and 2.0% of the nodule weight. The tumbling times used to obtain uniform coatings were 10, 20, and 10 minutes, respectively. The tumbling was performed at the rate of 9 r.p.m. No specific period of retention time in the tumbling drum is necessary for providing the carbon coating although with less retention time more carbon is required for an equivalent coverage.

After the carbon coated phosphate nodules have been removed from the tumbling drum coke is added to bring the carbon content of the feed up to the desired amount. Lump silica is also added to the nodules as they are moved by means of a conveyor system to the furnace.

As is well known in the art, carbon is a very conductive substance and the coating of the burden with carbon would normally be expected to increase the conductivity along which current would flow from the electrode to the walls of the furnace once bridging has taken place. Applicant has discovered not only that the bridging ordinarily accompanying the production of elemental phosphorus does not take place, but also that the current loss which would be expected when the phosphate lumps are coated with a weight percentage of carbon does not occur.

However, the addition of too much carbon on the surface of the nodules does tend to increase the conductivity and hence the quantity of carbon added should be controlled within the limits specified above.

The exact theory by which the carbon coating prevents the bridging is not known. However, it is known that the carbon is not wetted by the molten silicate and hence the carbon coated lumps show little tendency to cohere.

The following examples are demonstrative of the invention and it should be understood that applicant does not intend to be limited to the specific examples described.

Example I

Three hundred parts of 6/20 mesh shale were heated above the melting temperature of gilsonite and 5% of gilsonite based on the weight of the shale was added. The mixture was added until the shale particles were well coated with molten gilsonite. The coated shale was then calcined at 700–800° C. to coke the gilsonite. The product formed was non-coherent. Sufficient coke of 6/20 mesh size was added to bring the carbon content of the burden up to 15% based on the weight of the shale. Five percent by weight of silica based on the weight of the shale was added and then coated shale, coke and silica were mixed and fed to the furnace. The charge fed in smoothly and uniformly without bridging until substantially all the charge was consumed. The voltage and amperage remained fairly constant.

Melting was essentially complete in 13 minutes and about 270 parts of the shale were melted.

Example II

Three hundred parts of calcined shale of 6/20 mesh were tumbled in a rotating cylinder with 1% carbon black based on the weight of the calcined shale. Forty-two parts 6/20 mesh coke and 15 parts of 6/20 mesh silica based on the weight of the shale were added. The mixture was fed to the furnace and the charge fed smoothly and uniformly without bridging. The amperage and voltage remained fairly constant. The melting was essentially complete in ten and one-half minutes and approximately 224 parts of the shale were melted.

Example III

This example demonstrates the increased conductivity of the carbon coated nodules as the weight of carbon on the nodules increases.

Calcined shale of −1″+½″ mesh size was used in this example. Five samples of the shale were coated with varying amounts of carbon black. Each shale sample was coated with carbon by placing the sample in a ball mill (without any balls) and adding a weighed amount of carbon. The mill was rotated at 27 r.p.m. for 10 minutes for each run.

The resistance of the coated nodules from each run was measured. These results are set forth below.

| Carbon used, Percent by wt. | Resistance of nodules, ohms |
|---|---|
| 0.5 | $3.07 \times 10^6$ |
| 1 | $2.33 \times 10^5$ |
| 2 | $9.7 \times 10^3$ |
| 4 | $9.17 \times 10^2$ |
| 6 | $3.73 \times 10^2$ |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and hav- That which is claimed as patentably novel is:

1. In a process for the production of a free flowing non-sintering phosphate burden in an electric phosphorus furnace, the improvement which comprises coating the phosphate lumps with 0.1 to 2% by weight of finely divided carbon based on the weight of the phosphate lumps.

2. A process for the production of a free flowing, non-sintering phosphate burden in an electric phosphorus furnace, the steps comprising coating substantially all of the phosphate particles of the burden with about 0.1 to about 2.0% finely divided carbon based on the weight of the particles, mixing the coated particles with silica and coke and passing the burden into the furnace.

3. A process according to claim 2 in which the particles are coated with 1.0 percent fine carbon based on the weight of the particles.

4. The process according to claim 2 in which the particles were coated with 1 percent carbon black based on the weight of the particles.

5. A process for the production of a free flowing, non-sintering phosphate burden in an electric phosphorus furnace, the steps comprising coating substantially all of the phosphate particles of the burden with about 0.1 to about 2.0 percent of −325 mesh carbon black based on the weight of the particles, mixing the coated particles with silica and coke and passing the burden into the electric furnace.

References Cited in the file of this patent

UNITED STATES PATENTS

| | | |
|---|---|---|
| 2,675,307 | Klugh et al. | Apr. 13, 1954 |

FOREIGN PATENTS

| | | |
|---|---|---|
| 347,937 | Great Britain | May 7, 1931 |
| 395,844 | Great Britain | July 27, 1933 |

UNITED STATES PATENT OFFICE
CERTIFICATE OF CORRECTION

Patent No. 2,967,091                          January 3, 1961

James Allen Robertson

It is hereby certified that error appears in the above numbered patent requiring correction and that the said Letters Patent should read as corrected below.

Column 2, line 36, for "tape" read -- tap --;
column 3, line 20, for "located" read -- coated --.

Signed and sealed this 19th day of September 1961.

(SEAL)
Attest:

ERNEST W. SWIDER                                DAVID L. LADD
Attesting Officer                                     Commissioner of Patents

USCOMM-DC